Patented June 19, 1928.

1,674,405

UNITED STATES PATENT OFFICE.

LEON LILIENFELD, OF VIENNA, AUSTRIA.

CELLULOSE COMPOUND AND PROCESS FOR MAKING SAME.

No Drawing. Application filed July 23, 1924, Serial No. 727,806, and in Austria April 4, 1924.

According to this invention new cellulose compounds may be obtained by allowing ammonia to act upon those products, or reaction mixtures, which are obtained when a monohalogen derivative of a fatty acid acts upon a cellulose-xanthic acid or a cellulose-xanthate (viscose). In view of the mode of their production and their chemical properties these products, or the reaction mixtures containing them which serve as parent material for the present process are hereinafter referred to as "cellulose-xantho-fatty acids".

The new cellulose compounds are insoluble, or practically insoluble, in water, but soluble in aqueous alkalies. When their solutions in alkalies are treated with substances which neutralize the alkali (such as organic or inorganic acids, acid salts, ammonium salts or the like), or with dehydrating agents (such as salts, alcohols or the like), precipitates or coagula separate which, when the solutions are brought into suitable forms, are obtained in the condition of transparent, solid, flexible products, such as threads, films or plates.

The working conditions may be varied within wide limits. For this reason the invention is not limited to the details of the description which follows (supported by working examples) of its practical utilization since these details do not affect the essence of the invention.

Cellulose-xantho-fatty acids are advantageously prepared (for example according to the process described in Patent No. 1,642,587) by acting with monohalogen fatty acid or a salt or a derivative thereof upon a free cellulose-xanthic acid (for example raw or purified viscose neutralized or even made acid by means of a weak acid) or upon a salt (for example an alkali or a zinc salt) thereof.

The cellulose-xanthic acid or the cellulose-xanthate may be subjected to the action of the halogen fatty acid in the form of a solution or paste or in the form of the reaction product obtained when carbon disulphide acts upon alkali cellulose prior to its dissolution. The cellulose-xanthic acid or the cellulose-xanthate may be converted into the cellulose-xantho-fatty acid either in the crude state or after purifying it by any known process and may be used for the treatment with the monohalogen fatty acid in the alkaline state or be neutralized or acidified before the addition of the monohalogen fatty acid or of a salt or derivative thereof. In all cases, where the context permits, the expressions "viscose", "cellulose-xanthic acid", and "cellulose-xanthate" are intended in the description and claims to include the forms of the cellulose-xanthic acids and cellulose-xanthates mentioned in this and in the preceding paragraph and to mean the free acids and salts.

The interaction of the cellulose-xanthic acid or of the cellulose-xanthate, and the halogen fatty acid on the one hand, and of the cellulose-xantho-fatty acid and ammonia on the other hand, may be carried out in two separate processes, or they may be combined into a single operation. In other words: The ammonia can be added either to the isolated cellulose-xantho-fatty acid or to a salt thereof, or to the reaction mixture containing it or to the cellulose-xanthic acid or the cellulose-xanthate (viscose) before, during or after the addition of the halogen fatty acid or of a salt or derivative thereof.

The cellulose-xantho-fatty acid or a salt thereof may be used for the treatment with ammonia in a neutral, alkaline or acid solution; the cellulose-xantho-fatty acid may also be subjected to the action of the ammonia in solid form or in the form of a suspension (for instance in alcohol).

In most cases the reaction occurs even at normal temperature; gentle or stronger heating usually accelerates it.

The ammonia may be used in the form of gas or as a solution, in excess, or in the theoretical quantity, or in a quantity which is less than the theoretical quantity.

The formation of the new cellulose compounds is indicated when the reaction is carried out in solution, and provided that the reaction mixture contains no substance (for example a sufficient quantity of alkali) which would dissolve the final product or prevent its formation, by the separation of the final product of the reaction. If the solution of the cellulose-xanthic acid or of the cellulose-xanthate or of the cellulose-xantho-fatty acid is concentrated, or if the mixture be insufficiently stirred, or be not stirred at all, then the product usually separates in the form of stiff or soft jellies; if the solution be suitably diluted and stirred, the product separates in the form of fine or coarse, usually flocculent, precipitates.

The final product of the reaction may be isolated for instance by separating the precipitate, or the jelly from the mother liquor by filtration, straining through cloth, centrifuging or the like and then thoroughly washing it. The washed substance is then either dissolved in the wet state (if necessary after first freeing it from the bulk of adhering washing liquid by pressing, suction or the like), or dried.

According to their mode of formation and chemical behaviour the new cellulose compounds are thiourethanes, thiocarbamic acid esters or xanthamides) of cellulose or of the cellulose group.

The following examples illustrate the invention, the parts being by weight:

I.

(a) 1000 parts of crude viscose (prepared for instance by soaking 100 parts of sulphite cellulose in fleece- or sheet-form in 1000 to 2000 parts of caustic soda solution of 18 percent strength at 15° to 18° C., for a period of 3 to 24 hours allowing to stand at room temperature, pressing until the weight is reduced to 300 to 350 parts, disintegrating, if necessary allowing to ripen for a period of 6 to 72 hours at room temperature, treating for several hours with 50 to 60 parts of carbon disulphide and dissolving in so much water that the total weight of the solution is brought to 1000 parts) corresponding to 100 parts of cellulose as parent material, are diluted either in a fresh condition or after standing for a long or short period (for instance from six hours to three days), with 2000 to 5000 parts of water and there is then added whilst stirring dilute acetic acid (for instance, of 5–10 percent strength) until a faintly alkaline or neutral reaction is obtained. As soon as the hydrogen sulphide evolved during the neutralization has escaped wholly or in greater part, there is added to the viscose, which has become light in colour a solution of sodium monochloracetate prepared by dissolving 60 to 100 parts of monochloracetic acid in 480 to 800 parts of water and neutralizing the solution with powdered sodium bicarbonate. As soon as the solution of sodium monochloracetate has become incorporated with the viscose, the mixture is stirred for a short time and is allowed to stand at room temperature. After standing from 6 to 48 hours (if the reaction mixture has a weak alkaline reaction it may be neutralized) there are added, whilst stirring 100 to 300 parts of an aqueous solution of ammonia of 25 percent strength. After a few hours, the reaction product begins to precipitate on stirring well in the form of light bulky flakes. As soon as the separation is complete, or after the mixture has been allowed to stand for a period of from a few hours to three days after the separation is complete, the precipitate is separated from the mother liquor by decanting, filtering, filtering by suction, straining through cloth or centrifuging; it is then thoroughly washed with water and is then dried at reduced or atmospheric pressure if necessary, after treatment once or several times with alcohol first, or with alcohol and then with ether.

The final product, especially after disintegration, is a powdery or granular substance insoluble or scarcely soluble in water, alcohol or ether. It is readily soluble however in dilute solutions of alkali (for example caustic soda solution of 1–10 percent strength).

Its solutions in dilute caustic soda, when spread on a sheet of glass and treated with a suitable precipitating liquid (for example a solution of ammonium chloride of 20 percent strength or dilute sulphuric acid or aqueous acetic acid), yield films which are firm in the wet state and which are transparent and lustrous when dry.

(b) The procedure is as in Example I (a), with the difference that 500 parts of ammonia solution of 25 percent strength are used. The excess of ammonia does not produce any variation in the properties and solubilities of the product.

(c) The procedure is as in Example I (a) or I (b), with the difference that the ammonia is added at once or soon, for example from 10 minutes to 1 hour, after the sodium monochloracetate has been added to the viscose.

II.

The method of operation differs from that of the preceding examples in the fact that the viscose is not neutralized prior to the addition of the monochloracetic acid. The reaction mixture is, however, neutralized with diluted acetic acid prior to the addition of the ammonia.

Generally speaking the products obtained have the same properties and solubilities as those obtained with the aid of viscose which has been neutralized or made faintly acid.

In the preceding examples, instead of monochloracetic acid there may also be used an equivalent quantity of a halogen derivative of a homologue of acetic acid (for example α-bromopropionic acid or α-bromobutyric acid or bromo-succinic acid). The final products of the reaction have analogous properties to those obtained by the use of monochloracetic acid.

Instead of the crude viscose in the preceding examples there may be used viscose which has been purified by any suitable method, as for instance by precipitating it with a saturated solution of common salt, and washing it with a solution of salt of 10 percent strength.

In the preceding examples instead of the bleached or unbleached sulphite-cellulose used as the parent material for making the cellulose-xanthic acid or cellulose-xanthate there may be used any other bleached or unbleached cellulose (for example bleached cotton or linters) or a material containing cellulose or a conversion product of cellulose (for example the products obtained by mercerizing cellulose with a strong alkali solution and if necessary washing, or by grinding it with water, or by the action of a strong mineral acid or of a zinc halide or of an ammoniacal solution of copper oxide or a cellulose hydrated or hydrolyzed by any other method or an oxycellulose) or a cellulose derivative which still contains a free hydroxyl group permitting to be converted into a thionthiolcarbonic acid ester (for example, an alkali-soluble alkyl, oxyalkyl or hydroxyalkyl derivative of cellulose, or a cellulosehydroxyparaffinmonocarboxylic acid or the like.

In the description and claims, wherever the context permits, the term "cellulose" in itself or in combination with "xanthic acid" or "xanthate" or "xantho-fatty acid", or "xanthic acid ester" or "thiocarbamic acid ester" or "thiourethane", that is to say in any combination, includes cellulose itself, and the conversion products and derivatives of cellulose mentioned in the preceding paragraph.

III.

100 parts of cellulosexanthacetic acid, prepared for example by diluting 1000 parts by weight of a viscose prepared according to Example I (a) and containing 10 per cent of starting cellulose with 5000 parts of water, adding to the diluted viscose a neutralized solution of 60–100 parts by weight of monochloracetic acid in 480–800 parts of water, allowing the reacting mixture to remain at room temperature for 5–48 hours, precipitating the cellulose xanthacetic acid by means of sulfuric acid of 1–3 per cent, washing the precipitate with water and drying it optionally after a previous dehydration with alcohol, are dissolved in 4000 to 5000 parts of an aqueous solution of ammonia of 0.05 percent strength and there are added to the solution whilst stirring 100 to 300 parts by weight of an aqueous solution of ammonia of 25 percent strength. After a short time (about 20 minutes) the separation of the cellulosexanthamide begins. After standing for a period of 10 to 48 hours the precipitate is separated from the mother liquor and worked up as described in the preceding examples.

The properties and solubilities of the cellulosexanthamide resemble those of the product obtained in Example I (a).

The expressions, (1) a substance containing the characteristic radical of a cellulose-xantho-fatty acid, (2) a substance containing the characteristics radical of cellulose-xantho-acetic acid, (3) a substance containing the characteristic radical of a monohalogen fatty acid, (4) a substance containing the characteristic radical of monochloracetic acid, in the following claims are intended to include the acids themselves as well as the salts of the acids.

I claim:

1. A process for the manufacture of a cellulose compound which comprises acting upon a substance containing the characteristic radical of a cellulose-xantho-fatty acid with ammonia.

2. A process for the manufacture of a cellulose compound which comprises acting upon a substance containing the characteristic radical of cellulose-xantho-acetic acid with ammonia.

3. A process for the manufacture of a cellulose compound which comprises treating viscose with a substance containing the characteristic radical of a monohalogen fatty acid and then with ammonia.

4. A process for the manufacture of a cellulose compound which comprises treating viscose with a substance containing the characteristic radical of monochloracetic acid and then with ammonia.

5. A process for the manufacture of a cellulose compound which comprises treating viscose with a substance containing the characteristic radical of a monohalogen fatty acid and with ammonia.

6. A process for the manufacture of a cellulose compound which comprises treating viscose with a substance containing the characteristic radical of monochloracetic acid and with ammonia.

7. As a product, thiourethane of the cellulose group in which neither of the amido hydrogens is replaced by an organic radical.

In testimony whereof I affix my signature.

LEON LILIENFELD.